United States Patent [19]

Broome et al.

[11] Patent Number: 4,466,336

[45] Date of Patent: Aug. 21, 1984

[54] CONTROL VALVE FOR HYDRAULIC MOTOR APPARATUS

[75] Inventors: J. Wesley Broome, Franksville; Richard W. Witt, Hartford, both of Wis.

[73] Assignee: Lakeland Hydraulics, Inc., New Berlin, Wis.

[21] Appl. No.: 346,651

[22] Filed: Feb. 8, 1982

[51] Int. Cl.[3] .................... F15B 13/042; F16K 15/18

[52] U.S. Cl. .................................... 91/420; 60/460; 91/445; 91/447; 91/452; 91/468; 137/599.2; 137/601; 137/630.15

[58] Field of Search .................. 91/452, 420, 445–447, 91/468, 453; 60/460; 137/599.2, 601, 630.15

[56] References Cited

U.S. PATENT DOCUMENTS

| | | | |
|---|---|---|---|
| 2,360,987 | 10/1944 | Temple | 137/630.15 |
| 3,623,509 | 11/1971 | Sesseler | 137/630.15 |
| 4,078,475 | 3/1978 | Fillion | 91/452 X |
| 4,244,275 | 1/1981 | Smilges | 91/420 |

FOREIGN PATENT DOCUMENTS

| | | | |
|---|---|---|---|
| 51728 | 5/1982 | European Pat. Off. | 91/420 |
| 561814 | 7/1977 | U.S.S.R. | 91/420 |

*Primary Examiner*—Edward K. Look
*Attorney, Agent, or Firm*—Andrus, Sceales, Starke & Sawall

[57] ABSTRACT

A counterbalance valve connects a source of hydraulic fluid to a power piston-cylinder unit for positioning and/or holding a load such as a pivoted bucket arm of earth moving equipment. A directional control valve is operable to reverse the supply connection to the cylinder unit and to operatively close the connections thereto to hydraulically lock the cylinder unit and attached load in place, with a highly restrictive bleed passageway. The counterbalance valve has a first valved passageway between a pair of ports which includes a check valve to provide one directional flow between the two ports. A dual poppet valve unit includes a pair of parallel passageways in parallel with each other and with the first passageway. The double poppet valve includes a main poppet valve having a valve stem with a piston head and a spaced member of a larger effective area. Under abnormal pressure conditions, a controlled opening of the main poppet valve unit occurs because of the differential area and releases the high pressure condition through the bleed passageway. The stem includes a central opening within which a second poppet valve stem is located. A pilot piston and chamber is releasably mounted in alignment with the poppet valve stems and is connected via a restricted passageway to sense the pressure in the power cylinder to sequentially open the poppet valves. The restricted flow of the small poppet creates controlled slow lowering of the bucket. The diameter of piston and chamber may change to control the system characteristic.

11 Claims, 8 Drawing Figures

CONTROL VALVE FOR HYDRAULIC MOTOR APPARATUS

BACKGROUND OF THE PRESENT INVENTION

This invention relates to a control valve for hydraulically actuated load positioning devices and particularly to a flow control valve of a counterbalance construction.

Hydraulically driven carrier apparatus is used in various industrial applications for transport and positioning a load. The speed of the carrier apparatus may be accurately controlled by proper control of the flow rate of the hydraulic fluid through a reversible hydraulic motor means. The system advantageously may use a suitable hydraulic pump to supply operative hydraulic fluid under pressure to the motor. The output of the pump is selectively connected to the load positioning apparatus through a directional control valve to control the direction and the speed of movement. Under positive load conditions, a full flow connection may advantageously be supplied to the load positioning device. However, under negative load conditions, the flow control system must prevent undesired and uncontrolled rapid movement of the load. Typically hydraulic motors are of a linear piston-cylinder construction. Rotary hydraulic motors are also employed and particularly as traction power source for mobile equipment, such as off-the-road vehicles.

The hydraulic motors, of course if over driven such as by gravity forces, function as a pump and will in fact partially evacuate the fluid input side of the motor. Such action can result in complete loss of control, particularly loss of braking action with a resulting runaway condition. Further, the operator cannot possibly anticipate the changing load conditions to accurately control the flow so as to prevent undesirable motion. For example, in earth moving equipment, such as bucket loaders, crane devices and the like, the load member is biased by gravity for dropping or lowering movement. In such applications as well as others, the load under certain conditions may overrun the supply and become a pump device thereby creating a negative load condition. In the absence of compensating means, the load may drop in a more or less uncontrolled manner. Such uncontrolled or unrestricted movement of the load may not only severly damage the equipment but may harm surrounding personnel. Various control valves have been suggested in which the negative load condition in a hydraulically system is monitored and controlled. For example, the recently issued U.S. Pat. No. 4,018,136 which issued Apr. 17, 1977 to Lorel D. Kaetterhenry discloses a control valve for hydraulically driven apparatus, such as earth moving and construction equipment and the like. The control valve shown therein is a dual section valve including a pilot operated check valve having a pressure sensitive pilot operator coupled to the drop power end of the power cylinder. The valve unit is actuated to permit a relatively full flow to and from the power cylinder to raise the bucket or move the load. During lowering, if a negative load condition is generated, the spool valve responds to close and develop a restricted flow. The valve includes a second pilot operated safety valve which is connected in series with the spool valve having a similar pressure sensitive pilot operator. In the event of a precipitous change in the pressure conditions, the safety valve is operated to close and in essence to hydraulically lock the fluid motor in position to prevent precipitous dropping movement of the load. The system thus provides a pair of series connected pilot operated control valve in combination with a pilot operated safety valve which continuously relies on the pressure differential of the hydraulic motor.

Fixed orifice flow regulators control the flow rate to minimize the runaway condition of a hydraulic motor under negative loads. However, a fixed orifice regulator tends to provide a damp oscillation with a chattering type of movement. Piston-type systems in many instances do not provide the necessary response and change with pressure condition in a time delay response with a corresponding chattering or erratic movement of the load. Improved pilot operated valve structure have been suggested in which the response is more accurately and fully controlled in response to flow conditions including piloted response to both motor directional drives or a combined unit having a check valve flow for lifting combined with pilot operated lowering.

For example, recently issued U.S. Pat. No. 4,051,864 which issued Oct. 4, 1977 discloses a flow regulating valve for again controlling the supply of hydraulic liquid to a similar hydraulic power cylinder, shown applied to the lifting mechanism of a fork lift unit. As noted therein various problems have been noted in the control of construction equipment and other similar lifting devices such as fork lift trucks to create safe, reliable and smooth operation.

Further, the control valves should provide essentially instantaneous and smooth response to the changing pressure conditions as well as compensating for such changes in order to maintain a smooth controlled movement of the load. Further if the supply is shut off to both sides of the motor, hydraulic positioning and holding of the load in place is established. This of course requires reliable trapping of the hydraulic liquid to the opposite sides of the motor.

Generally, it has been found extremely difficult to provide a positive, reliable control while simultaneously maintaining the system lock condition.

When hydraulic holding of the load is provided, problems may be encountered, for example, in response to temperature variations, and even excessive load conditions. The pressure can build up in the system beyond the mechanical capability of the housing and passageway system. If such occurs a failure in the system may result in unexpected and uncontrolled release of the load.

Although various other patents have also been considered, the problem associated with the control of flow to and from hydraulic motors subject to negative loading and/or requiring a hydraulic holding require special consideration to produce the desired smooth movement of the load under both positive and negative loading conditions.

SUMMARY OF THE PRESENT INVENTION

The present invention is particularly directed to a flow control valve for supply of pressurized hydraulic fluid to a reversible hydraulic motor subject to positive and negative pressure load conditions, with means to establish and maintain a highly interrelated input/output flow under both positive and negative loading conditions so as to maintain a smooth, efficient movement of the load. Generally, in accordance with the present invention, a triple flow passageway means is provided including a first passageway having a full flow valve means connected in the flow system for lifting and similarly driving the hydraulic motor under positive load conditions in combination with a dual passageway interrelated dual poppet control valve having a main flow passageway and a restricted flow passageway in parallel. A pilot operator is coupled sequentially to the restrictive flow poppet and then to the main flow poppet for controlling the flow for lowering loads wherein negative load conditions may be encountered. The system is particularly constructed and arranged to permit automatic and controlled release of pressure under abnormal dangerous pressure conditions as a result of an abnormal operation of the controlled load which creates a large pressure or such as might be created in response to increase in thermal conditions in a hydraulically locked holding condition. Generally, in accordance with the teaching of the present invention, the control valve includes the parallel passageways between a pair of load ports. The first passageway includes a check valve type control to provide direct differential responsive flow between the two ports. The second pair of passageways are specially constructed with a pilot operated dual poppet control valve unit. The check valve unit and the dual poppet valve unit are specially constructed and arranged to provide a positive closure at the directional control valve between the pump source and one side of the hydraulic motor to thereby lock the hydraulic motor in the desired position. However, under abnormal pressure conditions on the load side of the valve, a controlled opening of the poppet valve unit releases the system to permit discharge of hydraulic fluid through a highly restrictive bleed or leakage flow through the main directional control valve and a gradual, partial load movement and with a consequent release of the high pressure condition. Further, if the load is positively held, the pressure may increase rapidly and tend to rise to an unsafe level. With the present invention, the poppet valve opens to release such pressure and prevent creation of unsafe conditions. The control valve thus functions as an improved holding or counterbalance valve structure while compensating for dangerous pressure conditions within the system.

The double poppet valve unit in accordance with a preferred embodiment of the present invention includes a pilot operated poppet valve structure concentrically mounted within a main control poppet valve and responsive to the pressure in the hydraulic motor. The pilot operator is preferably constructed as a removable unit for selection of an operator of a proper response characteristic to the sensed motor pressure. The sensing connection preferably includes a damping restrictor to further stablize the system operation. The main poppet valve includes a differential area between a control piston or head and the valve member. Under abnormal pressure conditions, the differential area on the main poppet valve will allow controlled opening of the poppet valve against a biasing spring; thereby allowing the passage of liquid and the reduction in the abnormal pressure state. Under a controlled load lowering, the pressure supplied to the hydraulic motor and to the pilot operator will increase. As the pressure increases, the pilot operator opens the small poppet valve, thereby providing a controlled, restricted flow through the control valve. This establishes a controlled lowering rate of flow, and corresponding load movement. If the unit tends to drop and operate under negative load conditions, there is an immediate response to the drop in pressure to close the poppet and further restrict the flow, and if necessary to terminate flow.

If positive pressure is increased to lower the load more rapidly, the pilot operator is subject to and responds to the pressure increase to open the main poppet valve with a corresponding increase flow rate thereby permitting more rapid movement of the power movement of the load.

The present invention provides a control valve apparatus with the controlled differential area in the dual poppet arrangement providing particularly satisfactory response and control of the load, while maintaining a true counterbalance valve arrangement for hydraulically locking of the load in place, with both rapid positive movement of the load and highly regulated controlled movement under negative load conditions.

BRIEF DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a simplified illustration of the present invention applied to a power cylinder for the lifting arm structure of a back hoe or the like;

DESCRIPTION OF THE ILLUSTRATED EMBODIMENT

Figure 1:
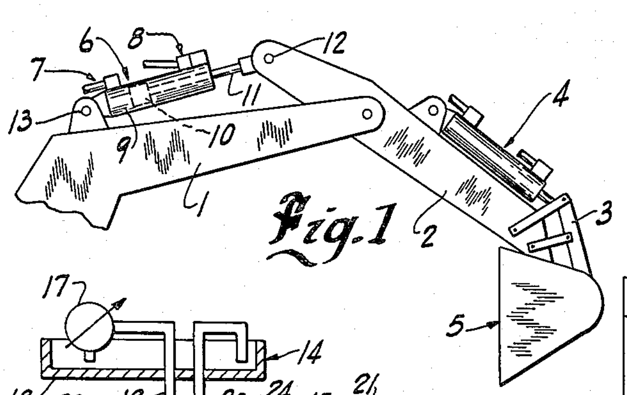
Figure 5:
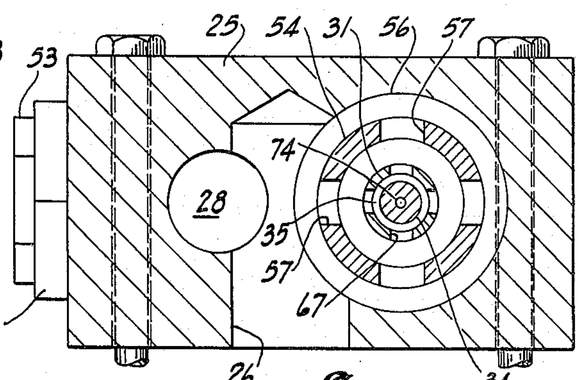
FIG. 5 is a similar view taken generally on line 5—5 of FIG. 2.

Referring to the drawing and particularly to FIG. 1, the present invention is shown applied to a hydraulically operated backhoe support arm unit which is attached to a mobile support, not shown. The arm unit includes a support arm 1 to which a lifting arm 2 is pivotally connected. A bucket arm 3 is pivotally secured to the outer end of the lifting arm 2 and biases the arm to rotate in a clockwise direction, as viewed in FIG. 1. In accordance with known constructions, a hydraulic motor 4, shown as a typical power piston-cylinder unit, is connected between the lift arm 2 and the bucket arm 3 for raising of a bucket 5 against the force of gravity and providing for controlled drop of the bucket. A second similar hydraulic motor 6 is interconnected between the support arm 1 and the lifting arm 2 to correspondingly provide controlled positioning of the bucket 5. The motor cylinder units are similarly constructed and controlled, and the cylinder unit 6 is shown and described in detail, as follows.

Figure 2:
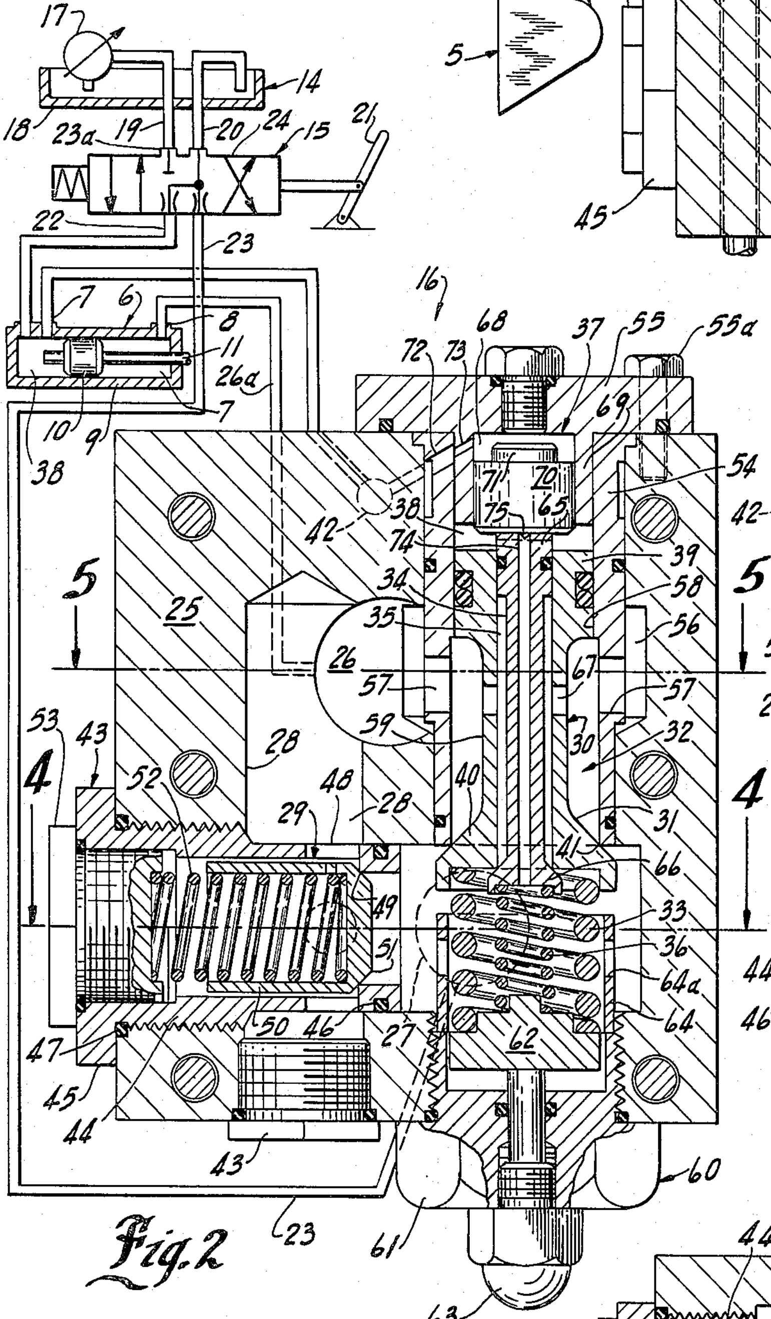
FIG. 2 is a diagrammatic illustration of a control system with a control valve constructed in accordance with the present invention shown in cross-section.

Referring particularly to the power cylinder unit 6, head and rod end port connections 7 and 8 are shown provided at the opposite ends thereof for selectively supplying and draining of hydraulic fluid to and from the cylinder 9 to the opposite sides of a power piston 10. A piston rod 11 is coupled to piston 10 and projects outwardly with the outer end thereof pivotally connected to the lifting arm 2 as at 12. The head end of the cylinder 9 is pivotally connected as at 13 to the support arm 1. As shown in FIG. 2, the ports 7–8 are connected to a suitable hydraulic fluid source 14 by a manually-operated directional valve 15 for selectively reversing the connection of the two ports to the source. Interposed between the control valve 15 and the rod end of the cylinder 9 is a counterbalance valve unit 16 having a pilot assist, which is constructed in accordance with the teaching of the present invention to provide a controlled movement of the lifting arm 2.

The hydraulic source 14 is diagrammatically shown as a conventional unit including a pump 17 and a reservoir 18 interconnected by suitable lines 19–20 to the directional valve 15.

The directional valve 15 is schematically shown as a three-position slide valve having a manual lever 21 control for selectively connecting the source lines 19–20 to cylinder connecting lines 22–23. The valve 15 has a center load lock position, as shown in full line in FIG. 2. The valve 15 is manually positioned in alternate directions from the lock position. In the one direction, with the valve moved to lift in FIG. 2, a direct connection of the cylinder 9 via line 22, with the line 23 connected to the rod end of the cylinder 9 in series with the counterbalance valve 16. In the alternate position, with the valve 15 positioned to the right in FIG. 2, the reverse connection is made.

The directional valve unit 15 may be of any other suitable construction depending upon the system requirements, such as a basic three position valve structure having a positive cutoff center section between end drive positions. In each position, the valve has passageways aligned with source lines 19–20 and the cylinder connecting lines 22–23, as clearly shown in FIG. 2. The valve structure is a known and available device and is not hereinafter described in detail other than as necessary to fully understand the present invention.

The center position is constructed to establish a blockage of the line 22 to the aligned head end of the cylinder unit 6. The return side of the system from line 23 and thus the counterbalance valve 16 also to the reservoir line 20 is through a restricted leakage or bleed passageway, which is schematically shown in FIG. 2 including a direct internal connection of the valve ports **23*a* connected to lines 22 and 23. Each such port 23*a* includes a high flow resistance or restrictor 24. Under normal pressure conditions, the restrictors 24 are operable to practically isolate lines 20 and 23, and thereby establish a hydraulic locking and holding of the bucket 5 in place, but the restrictors 24** are operable under abnormal conditions as a leakage or bleed passageway to allow limited leakage flow, as more fully described hereinafter.

The hydraulic motor 6, the hydraulic source 14 and the directional valve 15 may of course be of any suitable construction and are shown more or less diagrammatically in FIG. 2 and is therefore hereinafter described as necessary for purposes of clearly illustrating the functioning and purpose of the illustrated embodiment of the present invention, which is particularly directed to the holding or counterbalance valve unit 16.

Figure 6:
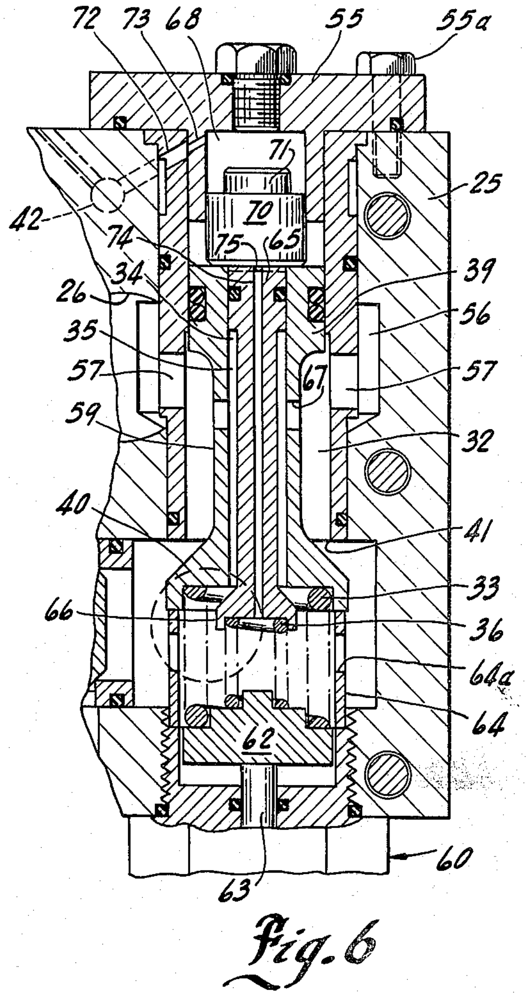
FIG. 6 is a fragmentary view similar to FIG. 2 showing a restricted load dropping action of the illustrated embodiment.

Generally, the illustrated embodiment of the counterbalance valve unit 16 includes a valve body 25 having a cylinder port 26 connected to the rod end of the cylinder 9 by line **26*a* and a valve port 27 connected to the output of the control valve 15 by line 23. Within the valve body 25 alternate and parallel passageways are defined between the two ports 26 and 27. The first passageway, as shown in FIG. 2, is a generally L-shaped passageway 28 having a check valve unit 29 mounted therein for controlling the flow between the ports 26 and 27. The check valve unit 29, as more fully developed hereinafter, positively prevents flow from the cylinder port 26 to the valve port 27 while responding to normal system pressure to fully open and provide full flow from the valve port 27 and therefor from valve 15 and therefore from the source 14 to the cylinder 9. This provides for a full, unrestricted flow to the power cylinder 9 during a raising or lifting action. However, in a dropping mode, the check valve 19 is biased closed and the only flow permitted is through an alternate passageway, which is controlled by a pilot assisted dual poppet valve unit 30. The unit 30 generally includes a main poppet valve member 31 slidably journaled within a main poppet chamber 32 which provides an alternate passageway between the ports 26 and 27, in parallel with the check valve passageway 28. The main poppet valve member 31 is resiliently biased to close the valve end of the chamber by a coil spring 33. A small inner poppet member 34 is mounted within the main poppet member 31 and is similarly constructed to define a third alternate parallel passageway 35 between the ports 26 and 27, when opened. The poppet member 34 is biased to the closed position by a coil spring 36. The poppet valve unit 30 includes and is conjointly controlled by a pilot assist operator 37 mounted in the valve body 25 and coupled to the head end of the cylinder 9. The pilot operator 37 responds to the increasing pressure in the cylinder head chamber 38 to first open the small inner poppet valve 34, producing a restricted flow in the alternate passageway 35. This provides for a controlled drop of the lifting arm 2. As the pressure increases, the pilot operator 37 engages the large poppet valve 31 which is opened, as shown in FIG. 6, thereby permitting an increased flow and a rapid lowering of the bucket and load because of the increased flow from the cylinder port to the reservoir. This provides a controlled lowering of the load, with the pilot operated poppet valve unit 30 establishing a slow rate of load drop, as well as a much more rapid drop rate, when demanded. In operation, the system thus provides a first controlled low rate and velocity drop under the control of the small poppet valve in combination with subsequent large flow rate and low velocity drop where desired. The dual poppet valve unit 30** is used to produce a high stability of operation. If a single large valve, which is subjected to system response, is used for controlling the relatively slow drop rate, the valve has a tendency to produce relatively large changes in flow in response to small movement of the valve, which introduces instability into the system.

More particularly, the main poppet valve has a piston 39 at the inner end and a valve member 40 which seats on a valve seat 41 adjacent to the valve port end of the passageway 35. The piston 39 has a smaller area than the effective seal area of the seat 41 and provides a differential pressure responsive area in the closed position of the poppet member 31. If the pressure increases with the valve closed, the differential area creates a pressure differential which tends to open the valve. Whenever such pressure exceeds, the spring preload established by the bias spring means 33, the main poppet valve will of course open to allow the liquid to escape and a small amount of the liquid flows through the bleed or leakage passageway provided by the restrictors 24 of the directional valve 15, and thereby release the pressure in the system. As previously noted, valve 15 may be of any suitable construction. For example, certain commercially available directional control valves have manufacturing tolerances, such as to provide the necessary leakage. Further, if thermal release is not desired the control valve can be constructed so as to prevent such response. Further, the valve operates as a safety release during positive decreasing of the load. Thus, if hydraulic fluid is supplied through the valve unit 30 to slowly drop the load bucket and an obstruction is encountered or for some other reason the load is driven so as to create an abnormal pressure condition in the port 26, the valve 31 opens as a result of the pressure condition and may provide a large pressure relief flow. The system can be readily designed and constructed to establish a controlled release at any desired pressure. In practice, the safety system is set to open at approximately 20% above normal maximum system pressure.

In the illustrated embodiment of the invention, the poppet valve unit 30 is biased closed by the spring means and/or the pressure in the valve port 27. Thus, with hydraulic fluid flowing from the direction of valve 15 to the cylinder 9, the pressure in the head end chamber 38 of the cylinder 9 and the pilot is low. The inner poppet valve 34 and the large poppet valve 31 are held closed by the separate spring means 33 and 36 and by the pressure at the valve port 27 to maintain the passages through the poppet valve unit 30 closed. The check valve 29 is biased closed by the spring and/or by the pressure in cylinder port 26.

In a center hold position of the directional valve 15, the hydraulic lock is thus created on the cylinder 9 and therefore the load. The resiliently loaded check valve 29 and the control valve 15 affect the seal in the holding or counterbalance position. In this position, if the pressure within the cylinder or the passageway system downstream of the control valve increases, for any reason, an automatic safety pressure release is provided to prevent rupture of the hose or other components of the hydraulic system.

More particularly in the illustrated embodiment of the invention, the valve body 25 is shown formed as a solid rectangular metal block. The cylinder port 26 and the valve port 27, as well as a pilot port 42 are drilled into the block from one wall or surface of the valve body. The ports of the valve body are arranged to mate with the cylinder connection in a manifold, not shown, which is connected to the directional valve and to the cylinder ports on the cylinder to establish the illustrated connection when bolted onto the cylinder body without external hoses and line connections. Thus, the separate hosing as shown in the diagrammatic illustration of FIG. 2 is used in commercial practice. As such structure is well known and can be readily provided by those skilled in the art, no further illustration or description thereof is given. The valve ports 26 and 27 are connected by internal passageways within the valve body as follows.

Passageway 28 is an L-shaped passageway which connects the cylinder port 26 to the valve port 27. The L-shaped passageway 28 is defined by a pair of intersecting drilled openings on adjacent sides of the body 25. The passageway 28 from the cylinder port 26 is sealed by a suitable closure cap unit 43 which extends into and terminates in slightly spaced relation to the intersecting cross bore of passageway 28. The check valve unit 29 is secured within the intersecting passageway and includes a cylindrical sleeve member 44 having an outer threaded attachment head 45 threaded into the drilled opening to securely attach the sleeve 44 in place. The sleeve 44 extends past the intersecting passageway and is sealed to the valve body as by a suitable O-ring seals 46–47 to the opposite sides of the passageway portion from the cylinder port 26. The sleeve 44 includes a plurality of peripheral openings 48, shown as four openings, in equicircumferentially spaced relation in alignment with the leg of the L-shaped passageway 28 extending from the cylinder port 26. The innermost end of the sleeve 44 is enlarged to define an inner valve seat 49 in alignment with the peripheral openings 48. A cup-shaped piston 50 is slidably disposed within the sleeve 44 with the innermost edge chamfered to form a valve seat 51 which is biased into engagement with the valve inner seat 49 on the valve sleeve 44 by a check valve spring coil spring 52. An outer closure cap 53 is secured to the outer end of the sleeve 44 as by a threaded connection and coil spring 52 acts between the cap 53 and the inner base of cup-shaped valve member or piston 50. The compression force of the coil spring 52 sets the operating range of the check valve and in particular determines the pressure limit for hydraulic fluid flow from the directional valve 15 to the cylinder 9. Once the check valve unit 29 begins to open of course and the complete face of the check valve piston is exposed to the pump pressure, the valve rapidly opens to a full flow condition and permits full flow from the source and valve port to the cylinder port.

The poppet valve unit 30 is located in a cross bore drilled completely through the valve body 25, generally parallel to the leg of the L-shaped passageway from the cylinder port 26 and the end of the other leg. A poppet valve sleeve 54 is secured in the end of the cross bore outwardly of the valve port 27. The sleeve 54 is a tubular member which fits snugly within the cross bore. A threaded outer cup-shaped head cap 55 projects into the sleeve 54 and abuts the valve body 25 and is secured in sealing relationship by a plurality of mounting bolts 55*a*. Appropriate O-ring seals close the passageway between the cap 55, sleeve 54 and the bore to positively seal the passageways against leakage along the outer interface between the sleeve and the bore. A transverse bore 56 is formed in the valve body 25 in alignment with the cylinder port 26 and extends completely through the cross bore and thus to the opposite sides of the sleeve 54. The sleeve 54 includes a plurality of peripherial openings 57 shown as four, which provide communication between the poppet chamber of passageway 32 and the cylinder port 26.

The main poppet member 31 is a spool-like member which is slidably journaled within the poppet sleeve 54. The poppet member 31 includes the piston head 39 slidably journaled in a cylinder 58 within the outer end of the poppet chamber or passageway outwardly of the transverse openings 57 to the cylinder port 26. The piston head 39 is slidably sealed by suitable O-rings. A reduced stem portion 59 projects outwardly through the sleeve 54 with the outer end enlarged to form the valve member 40 located immediately outwardly of the sleeve 54. The inner surface of the valve member is conically-shaped to form the valve seat adapted to sealably engage the inner edge 41 of the valve sleeve 54 and thereby define a valved opening and control fluid flow through the poppet passageway 32 between the valve port 27 and the cylinder port 26. The position of the poppet valve member 31 is controlled by the differential pressure acting between the valve head 39 and valve member 40 and the bias spring 33. The valve member 40 is shaped with an outer flanged or cup-shaped recess with the heavy bias coil spring 33 acting between the valve member 40 and a closure cap unit 60 secured to the outer end of the bore.

The closure cap unit 60 includes a cup-shaped cap 61 which threads into the end of the bore. A spring support plate 62 is mounted within the cup-shaped cap 61 with the coil spring 33 acting between the support 62 and the poppet valve member 40. A bolt-like member 63 is threaded into a correspondingly threaded opening in the center of the end cap 61 and includes an inner projection or rod end. The rod end engages and locates the spring support plate 62 to set the stress of the coil spring 33 and the initial holding force established on the poppet valve member 31.

A tubular stop 64 may be secured within the cap 61, as shown, and projects outwardly around spring 33 in alignment with the valve member 40 to limit the opening movement thereof. Stop 64 has equicircumferentially spaced openings 64a to maintain flow between the opened passageway 32 and port 27. Stop 64 may be used where special conditions are anticipated which would tend to move the valve member 40 and compress spring 33 to its limits with possible adverse effect on the spring characteristic.

As most clearly shown in FIG. 2, the bore of the poppet sleeve 54 is enlarged to be slightly greater than the diameter of the poppet head 39 and cylinder 58. This defines a flow chamber 32 of a diameter somewhat larger than that of the head 39. The effective cross-sectional area of the valve member 40, which is subject to the pressure at the cylinder port 26 whenever the poppet valve 31 is closed, equals the area of the chamber less that of the stem and is correspondingly greater than the effective cross-sectional area of the poppet head 39. The differential area condition is such that the poppet valve or unit 30 is held closed until the differential pressure force in the chamber exceeds the preload force of the large poppet spring 33, at which time the poppet valve automatically cracks open to release any abnormal pressure. This condition can occur under a counterbalance load state, as more fully developed hereinafter.

The main poppet member 31 includes a central cylindrical bore or opening defining passageway 35 within which the inner small poppet member 34 is located. The inner poppet member 34 includes a stem arrangement similar to the large poppet with a piston or head 65 on the one end journaled in the center bore of the piston portion of the large or main poppet member 31. The inner end of the poppet member 34 includes a reduced stem portion extending concentrically through the main poppet and with an outer enlarged head again defining a valve member 66 selectively engaging the edge as a valve seat 67 of the central poppet opening. The poppet member 34 is slidably disposed within the main poppet member. The small bias spring 36 also acts between the spring support 62 and a corresponding cup-shaped or flange end of the small poppet member 34 to urge the small poppet to a valve closed position.

A plurality of circumferential openings 67 in the main poppet member 31 immediately inwardly of its head 39 establishes communication between the poppet chamber 32 and the inner small poppet chamber or passageway 35 defined by the inner bore through member 31. This provides the third valved passageway between the valve port 27 and the cylinder port 26 in parallel with the L-shaped check valve passageway 28 and the main poppet passageway 32. The small poppet is selectively positioned against the spring load by the pilot operator unit 37. The center bore is of constant diameter and thus the small poppet valve is hydraulically balanced in its closed position.

The pilot operator unit 37 includes a small chamber 68 defined by a tubular extension member 69 of the outer closure head 55 of the poppet sleeve 54. A floating piston 70 is located within the pilot cylinder or chamber 68. The piston 70 includes an integral end spacer 71 on the one end which limits the outward positioning of the pilot piston to maintain an annular opening about the face of the piston. A small inlet opening 72 is formed in the sleeve and valve body from the inner edge of pilot chamber 68 and extends outwardly into connection to the pilot port 42 formed in the valve body 25. The pilot port 42 as previously described, is connected to the head end 38 of the power cylinder 6. The pilot chamber 68 is thus subjected to the corresponding pressure, and is biased by the cylinder head pressure to engage the projecting head 65 of the inner poppet member 34.

The inner poppet member 34 includes a central opening 74 extending throughout its length to provide a balanced condition on the opposite ends of poppet member 34. The end of the stem member 34 may be provided with cross-slots or openings 75 to prevent sealing of the center equaling opening 74. The pressure across the pilot piston 70 is thus equal to the differential pressure in the power cylinder unit 6. The floating pilot piston 70 and the chamber cap 55 may be changed to change the operating area of the pilot piston 70 for adjusting the system performance. This pilot pressure connection is formed with a restrictor or orifice member 73 which serves to directly stablize the movement and response of the pilot operator 37. The characteristic of the pilot operator 37 is therefore controlled by both the selection of orifice 73 and the size of the piston 70.

Figure 3:
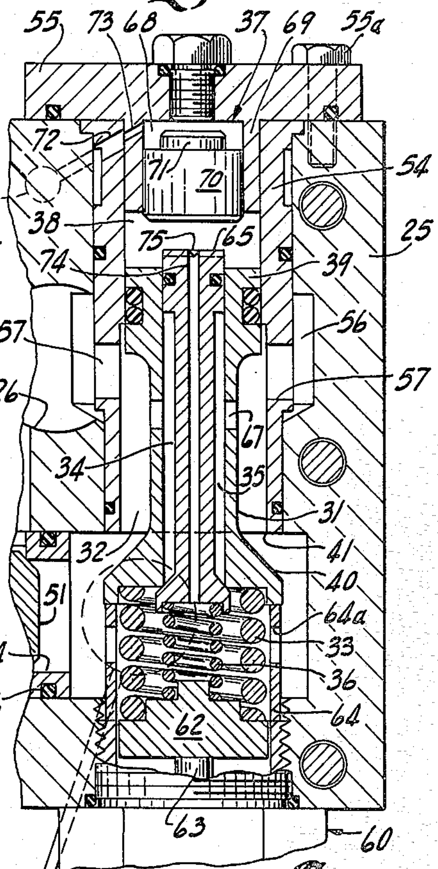
FIG. 3 is a fragmentary view of the control valve shown in FIG. 2 illustrating the control valve in a pressure relief position.
Figure 4:
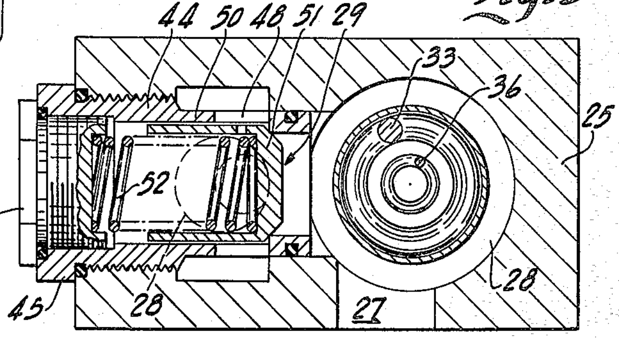
FIG. 4 is a view taken generally on line 4—4 of FIG. 2 and illustrating the porting arrangement of the illustrated embodiment of the invention.
Figure 7:
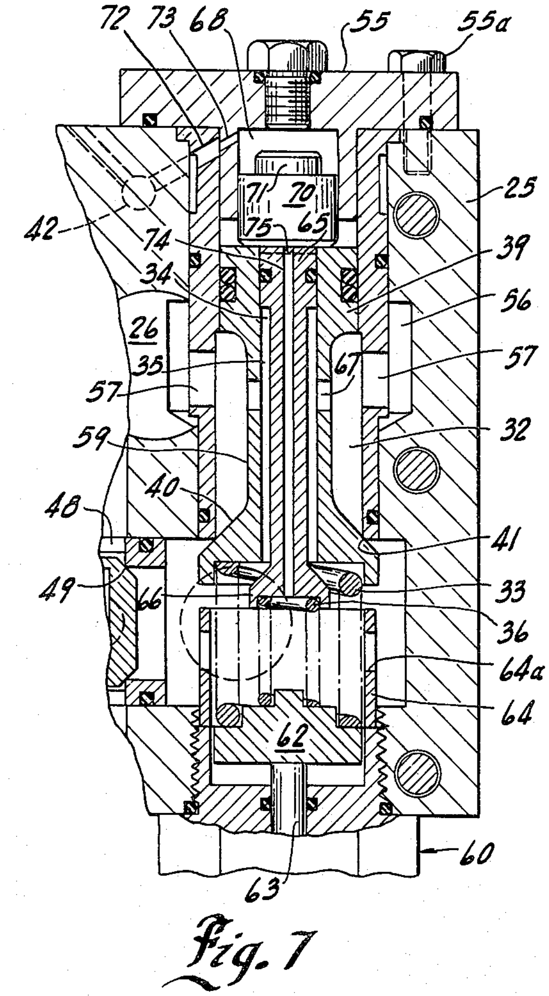
FIG. 7 is a view similar to FIG. 6 showing the control valve actuated in response to the sensed pressure in the power cylinder.

Therefore, as the pressure builds in the head end 38 of the power cylinder 9, such as incurred on a lowering or dropping load, the pressure will correspondingly increase in the pilot operator chamber 68 above the low force of the holding spring 36 of the inner poppet unit. The piston 70 moves toward the poppet valve unit 30 to open the small poppet valve 66–67, establishing a flow through small diameter passageway 35 from the cylinder port 26 to the valve port 27. This provides for controlled and restricted flow through the small poppet valve which provides a restricted and low rate of flow. The slow-flow rate retards the movement of piston 10 and thereby establishes a relatively slow rate of dropping of lifting arm 2 and the load bucket 5, with accurate and smooth control. If the load should tend to drop at an undesirable high rate for any reason, the piston cylinder unit 6 acts as a pump, attempting to force the flow rapidly through the system. This drops the pressure in the head end 38 of the power cylinder 9, resulting in a corresponding drop in pressure in the pilot cylinder 68. Any drop in pressure therein results in a rapid closing of the small inner poppet 34 to further restrict, and if necessary stop, the flow thereby reducing the dropping rate in a smooth and controlled manner. If, however, a driving force is impressed on the bucket, such as if the mobile unit is driven so as to move the outer side of the bucket into an earth bank, the pressure in the rod side of the cylinder port 6 and therefore in port 26 could reach damaging levels when the poppet valve closes. Under such a condition, however, the poppet valve 31 is forced open by the pressure differential on head 39 and valve member 40 to relieve the pressure, as shown in FIG. 3.

To establish a rapid drop, the pressure supply is increased thereby rapidly increasing the pressure to the pilot chamber 68. This forces the piston to fully open the small poppet 35 and to then open the large or main poppet valve 40–41. Once the main poppet valve is opened, a relatively large flow rate is established from the cylinder port 26 to the valve port 27 to the return side of the source 14. The large-flow rate mode change in the fully open position of the main poppet does not cause instability and/or erratic control movement.

As previously discussed, with the directional valve unit 15 in the center lock position, the load is held hydraulically. The apparatus may be operative in an environment of increasing temperature. Any significant increase in the temperature of the trapped hydraulic fluid will significantly increase the pressure in the system. Under certain conditions the pressure might be sufficient to rupture a conventional hose and system connections. In the present invention, the poppet valve unit 30 is constructed to provide an automatic relief. The differential effective area on the main poppet as defined by the difference in that of piston head 39 and valve member 40 is such that when the pressure rises above the strength of spring 33, the main poppet valve will crack open and release the trapped hydraulic fluid through the controlled leakage of the directional valve 15 or as otherwise provided sufficiently to prevent creation of unacceptable pressure conditions. For example, in a practical operation of earth moving equipment the system is designed to open if the pressure of the trapped hydraulic fluid rises to a level 20% greater than normal operate pressures.

Thus in summary, the counterbalance valve operates to permit rapid lifting of the load, a controlled safe dropping of the load and reliable hydraulic locking of the load in a hydraulic motor driven system. The locking position is shown in full line illustration in FIG. 2. With the control lever shifted to the right the source 14 is coupled to drain the cylinder head 38 and to directly supply high pressure fluid through the counterbalance valve unit 16 to the rod end of the cylinder unit 6. The flow through the counterbalance unit 16 is from the valve connected port 27 through the now opened check valve unit 29, which opens fully in response to the pump pressure, to permit full flow to port 26 and therefrom to the rod end of the cylinder unit 6.

The dropping or lowering of the load results by shifting of lever 21 to the lift to provide full pressure fluid to the head chamber 38 of cylinder unit 6 with the one controlled dual poppet valve controlling drain of the rod end of the cylinder unit 6. As fully described above, the dual poppet unit is conjointly controlled by the spring pressure and more importantly by the pilot operator 37 to permit a rapid dropping of the load where desired but with an automatic safe control under the action of the small poppet providing the restricted control flow.

Although shown applied to a backhoe type machine, the invention is equally applicable to cranes and various other hydraulic motor means of both the piston-cylinder construction, a rotary construction and the like. As applied to a piston-cylinder unit on a crane boom, the hydraulic supply connections would be reversed with a direct connection to the rod end and the control valve unit connected to the head end. Thus, the piston-cylinder unit is normally locked in place with the piston fully retracted or fully extended. Backhoe equipment is normally held in the retracted position, so the bleed connection is made to the rod end. For a crane device, the piston is fully extended in the lock position, and the valve is connected to bleed the head end of the cylinder unit. These and similar connections will be readily provided by those skilled in the art.

Further, the control valve unit may be used in both connections to the hydraulic supply. For example, in an over-center load vertical boom, the weight of the boom and the load acts to drive the hydraulic piston-cylinder unit as a pump in both directions of boom movement. Thus, such a boom is well known and is pivotally mounted to pivot about a lower end with the upper end swinging to opposite sides of a centered vertical position to lift a load, swing about its pivot, and drop the load to the opposite side of the boom. In this mode, the dual poppet control valve unit is similarly connected in each line in combination with a special anti-runaway valve means connected directly across the cylinder port connections. A dual control valve unit may be similarly connected to control a rotary motor for operating a rotary load such as a vehicle wheel, a reel device or the like wherein the load system may drive the hydraulic motor as a pump. In such application, the dual control valve unit is preferably formed in a single valve body with appropriate input and output ports as well as the necessary internal ports. Thus, each pilot input is connected to the upstream side of the check valve of the opposite dual poppet valve unit for appropriate sensing of the pressurized side of the motor and establishing a corresponding poppet operated control of the flow.

Figure 8:
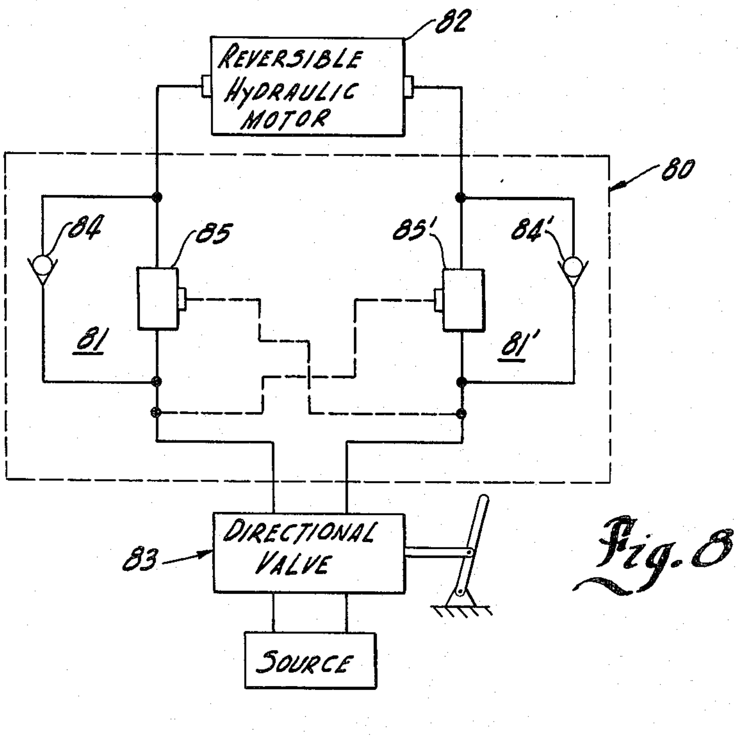
FIG. 8 is a schematic illustration of an embodiment of the invention applied to a rotary motor.

A typical dual control valve unit is schematically shown in FIG. 8 wherein an integrated control valve assembly 80 includes similar corresponding first and second control valves 81 and 81'. In FIG. 8 the two control valves 81 and 81' are shown connected between the opposite sides of a hydraulic motor 82, such as described above, and a directional valve unit 83. Each of the control valves 81 and 81' includes a check valve unit 84 and 84' and a double poppet valve unit 85 and 85'. The check valve units 84 and 84' are similarly connected to open in response to connection of supply pressure at the corresponding connection of the directional control valve unit 83, and the dual poppet valve units 85 and 85' are similarly connected to open in response to the pressure responsive operator or an abnormal pressure to the motor side or connection of the poppet valve unit. Each of the control valves 81 and 81' function in the same manner as the embodiment of FIGS. 1–6, with the poppet valve unit 85 or 85' of one of the valves 81 or 81' being operable with the check valve unit 84' or 84 of the opposite valve. The poppet valve unit provides a safety interlock to the opposite sides of the valve load 82. Thus, in the load locked position or in the presence of an abnormal pressure on the closed poppet valve unit, an automatic pressure release is established by one of the poppet valve units.

The present invention thus is designed to provide a reliable and safe load control valve apparatus for hydraulic motor means subject to over-running and driven conditions as well as substantial changes in temperature in a hydraulically locked and holding position.

Various modes in carrying out the invention are contemplated as being within the scope of the following claims, particularly pointing out and distinctly claiming the subject matter which is regarded as the invention.

I claim:

1. A flow control valve apparatus having a first port and a second port adapted to be connected in series to a first side of a hydraulic motor load to be controlled and with a hydraulic source to control the flow of hydraulic fluid between the source and motor means, comprising a first passageway means connecting said ports, valve means located in said first passageway means and operable to control the flow between said first and second ports, a first and second poppet valve means connected in parallel with each other and with said first passageway means between said first and second ports and defining second and third parallel passageway means between said first and second ports, said first and second poppet valve means each including a control member having a control head and a valve member subjected to the pressure of said second port, and at least one of said valve control members being constructed with said control head having a lesser effective area than said valve member, whereby the pressure in said second port opens the corresponding poppet valve in response to an abnormally high pressure one of said poppet valves means defining a restricted flow substantially smaller than the other of said poppet valve means to establish a restrictive flow from said second port to said first port, and a pilot operator means adapted to be connected to the hydraulic motor mean and to said hydraulic source and responsive to the pressure at the corresponding side of the hydraulic motor to sequentially open said first and second poppet valve means.

2. The flow control valve apparatus of claim 1 wherein said poppet valve means each include a poppet valve stem having said control head at one end and said valve member at an opposite second end, said stem of said first poppet valve member being a tubular member and said stem of said second poppet valve member being slidably disposed within said second first poppet stem member, said second port being connected to said passageway intermediate the positioning of said head and valve member of said first poppet valve means, said first poppet stem member having openings intermediate the head and valve means of said second poppet valve means, and means resiliently urging said first and second poppet valve stems to a closed valve position.

3. The flow control valve apparatus of claim 2 wherein said pilot operator means includes a pressure operating means mounted in alignment with the heads of said first and second poppet valve means and is operable to successively engage said second stem and then said first stem to successively open said passageways in response to the pressure applied to said pilot operator.

4. The flow control valve of claim 1 wherein said control members are mounted in telescoped relation with the control member of the second poppet projecting outwardly of the first control member, said pilot operator includes a piston chamber aligned with said heads and includes a floating piston movable into engagement with said heads, and means to change the effective area of said piston to control the performance of said control valve apparatus.

5. The flow control valve of claim 1 including an integral valve body having said first passageway means defined by a pair of intersecting bores to form an L-shaped passageway, said bores being formed from the outer surface of said valve body, said second and third passageway means being formed in a poppet valve bore extending through the valve body and intersecting with the L-shaped passageway, a transverse bore connecting said poppet valve bore to said second port, said first poppet valve means including a sleeve secured in the poppet valve bore and having openings aligned with said transverse bore, said sleeve terminating in spaced relation to said first port, said first poppet valve means having a stem with the head slidably sealed in said sleeve, said sleeve having an enlarged cross-section outwardly of said head and the valve member being located outwardly of the sleeve to define a valved opening at the end of the sleeve, said first poppet valve stem having a central bore of a substantially constant diameter and with peripheral openings, said second poppet valve means having a stem located in said opening with a head journaled in the central bore of the first poppet valve stem and the valve member located outwardly of the first poppet valve stem to define a second valved opening, and resilient means biasing said first and second named stems to close said valved openings, said pilot operator means including a pilot piston located in alignment with the stems of said first and second poppet valve member and operable to successively engage said stems to first open said second poppet valve member and subsequently open said first poppet valve member, and a pilot port in said valve body connected to said pilot chamber for connection to said hydraulic motor.

6. The valve apparatus of claim 5 wherein said first passageway means includes a sleeve located in the passageway coupled to the first port and having openings aligned with the bore coupled to the second port, the inner end of said sleeve having an interior annular seat, a check valve piston slidably mounted within said sleeve and including a resilient means urging the piston to engage said valve seat to close said first passageway means.

7. The valve apparatus of claim 6 having a closure cap secured to the poppet bore adjacent the first port and including an axially adjustable spring support, a first coil spring acting between the support and the first poppet valve stem, a second coil spring acting between the support and the second poppet valve stem, a pilot cap releasably secured in the opposite end of said bore and including a piston chamber.

8. A safety flow control valve for driving of a hydraulic motor means adapted to be overdriven with uncontrolled pumping action and adapted to be connected to a pressurized hydraulic supply including a lock control means having a bleed passageway means, comprising first and second parallel passageways between first and second ports, a check valve means in a first of said passageways and providing for flow in a first direction from the first port to the second port, a poppet valve means connected in the second passageway and operable to be selectively open to establish flow from said second port to said first port, said first port being adapted to be connected to said bleed passageway means, a pilot operator coupled to selectively open said poppet valve means in response to the pressure level at said motor means, and said poppet valve means being constructed and arranged to open independently of said pilot operator in response to abnormal pressure level at said second port.

9. The safety flow control valve of claim 8 wherein said poppet valve includes a valve stem member having a control head at one end and a valve seat member at the opposite end, a poppet valve chamber having a cylinder with said control head slidably journaled therein and an enlarged outwardly extending flow chamber coupled to said second port, said valve stem extended through said chamber and locating said valve member outwardly of the end of said chamber and conjointly therewith defining a valved opening into said chamber, and a preload spring coupled to said stem and operable to bias said valve member into engagement with the end of the valve chamber to close, said stem being subjected to a differential hydraulic force proportional to the difference in the effective areas of said head and said valve member and operable to open said poppet valve in response to a differential hydraulic force in excess of the force of said spring.

10. A hydraulic driven load system comprising a reversable hydraulic motor means adapted to be overdriven with uncontrolled pumping action, a pressurized source of hydraulic fluid, first and second control valves connected to the opposite sides of said motor means, a directional valve means connecting said motor means to said control valves and including leakage means to by-pass said directional valve means, each of said control valves including parallel passageways between a first port and a second port a check valve means in a first of said parallel passageways and providing of flow in a first direction from the first port to the second port, a poppet valve means connected in the second passageway and operable to be selectively open to establish flow from said second port to said first port, a pilot operator coupled to selectively open said poppet valve means in response to the pressure level at said motor means, and said poppet valve means being constructed and arranged to open independently of said pilot operator in response to abnormal pressure level at said second port.

11. The safety flow control valve of claim 10 wherein said poppet valve includes a valve stem member having a control head at one end and a valve seat member at the opposite end, a poppet valve chamber having a cylinder with said control head slidably journaled therein and an enlarged outwardly extending flow chamber coupled to said second port, said valve stem extended through said chamber and locating said valve member outwardly of the end of said chamber and conjointly therewith defining a valved opening into said chamber, a preload spring means coupled to said stem and operable to bias said valve member into engagement with the end of the valve chamber to close, said stem being subjected to a differential hydraulic force proportional to the difference in the effective areas of said head and said valve member and operable to open said poppet valve in response to a differential hydraulic force in excess of the force of said spring, said valve stem member being a tubular member having a central opening and having a second valve stem journaled therein, said second valve stem having an outer valve member adapted to engage the end of the first stem to seal said central opening and a spaced control head, said first stem having opening between said control head and valve member of said second stem, and a preload spring means coupled to bias said second stem to engage said first stem.

* * * * *

UNITED STATES PATENT AND TRADEMARK OFFICE

CERTIFICATE OF CORRECTION

PATENT NO. : 4,466,336

DATED : August 21, 1984

INVENTOR(S) : J. WESLEY BROOME ET AL

It is certified that error appears in the above-identified patent and that said Letters Patent is hereby corrected as shown below:

| | |
|---|---|
| Column 1, Line 50, | Delete "hydraulically" and substitute therefor ---hydraulic--- |
| Column 2, Line 3 , | Delete "valve" and substitute therefor ---valves--- |
| Claim 1, Column 13, Line 33, | After "pressure" insert ---,---(comma) |
| Claim 1, Column 13, Line 38, | Delete "mean" and substitute therefor ---means--- |
| Claim 10, Column 15, Line 32, | After "second port" insert ---,---(comma) |

Signed and Sealed this

*Seventh* Day of *May 1985*

[SEAL]

*Attest:*

DONALD J. QUIGG

*Attesting Officer* *Acting Commissioner of Patents and Trademarks*